UNITED STATES PATENT OFFICE.

WM. W. GAIGE, OF ROCHESTER, NEW YORK.

IMPROVEMENT IN COMPOSITIONS FOR TANNING LEATHER.

Specification forming part of Letters Patent No. 22,285, dated December 14, 1858.

*To all whom it may concern:*

Be it known that I, WILLIAM WERDEN GAIGE, of the city of Rochester, county of Monroe, in the State of New York, have invented a new and Improved Process for Tanning Hides; and I do hereby declare that the following is a full and exact specification of the same.

The nature of my invention consists in preparing and retaining the hides in a proper condition to receive the tan, so as to gain about five-sixths of the time usually occupied for tanning the same weight of stock. Said process consists in the use of four separate liquors, as follows:

To tan one hundred sides for sole or harness leather—

First liquor: To three hundred gallons of water add twenty pounds of sal-soda and eight pounds of common salt. After the hides are unhaired and ready for the tanning-liquor by the usual process of liming and bating, &c., then immerse them in the above liquor to remain forty-eight hours. The object of the above liquor is to open the pores and perfectly cleanse the hide, after which put them into the following or second liquor.

Second liquor: To three hundred gallons of water put sixty pounds of terra japonica or catechu and eight pounds of common starch, the hides to remain in this liquor two days. All that is required of this liquor is to simply set the grain. When sufficiently so put them into the next or Third liquor: To three hundred gallons of water put eighty pounds of terra japonica or catechu, eight pounds of starch, and six pounds of saltpeter, the hides to remain in this liquor ten days, or till entirely struck through with the tan, after which put them into the next or Fourth liquor: To three hundred gallons water put eighty pounds of catechu, eight pounds of starch, and ten pounds of alum, the hides to remain in this about six days, or till entirely filled and sufficiently plumped to be solid and firm.

All tanning-liquors are of their nature harsh, tending to destroy the life or strength of leather—hence the use of salt and starch. The former in the first liquor preserves the hides in a perfect healthy state. The latter modifies the harshness of the tanning-liquors. This process is equally effectual with bark liquors, but the object sought is to be able to use the catechu at a cheaper rate than bark.

Where I gain the principal advantage over the other processes is in the first liquor, in which my hides are made ready to receive the tan to the very center without loss of time, and with a much weaker liquor, enabling me to turn out that class of stock before mentioned in twenty days; lighter stock in less time in proportion to its weight.

I do not claim to have discovered any new material for tanning except what is known more or less to the trade; but I do claim—

1. To have invented the use of salt and sal-soda in the proportion specified for a preparatory liquor.

2. The combination of starch and catechu in the proportion specified for the second or first tanning-liquor.

3. The combination of starch, catechu, and saltpeter in the proportion specified for the third liquor.

4. The combination of starch, catechu, and alum in the proportion specified in the fourth liquor.

W. W. GAIGE.

Witnesses:
J. F. CALLAN,
JNO. H. JOHNSON.